United States Patent
Nilsson et al.

(10) Patent No.: US 10,973,035 B2
(45) Date of Patent: Apr. 6, 2021

(54) SCHEDULING OF WIRELESS COMMUNICATION DEVICES

(71) Applicant: Telefonaktiebolaget LM Ericsson (publ), Stockholm (SE)

(72) Inventors: Thomas Nilsson, Malmö (SE); Rocco di Taranto, Lund (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/606,909

(22) PCT Filed: May 24, 2017

(86) PCT No.: PCT/EP2017/062506
§ 371 (c)(1),
(2) Date: Oct. 21, 2019

(87) PCT Pub. No.: WO2018/215061
PCT Pub. Date: Nov. 29, 2018

(65) Prior Publication Data
US 2020/0137771 A1    Apr. 30, 2020

(51) Int. Cl.
*H04W 72/12* (2009.01)
(52) U.S. Cl.
CPC ..... *H04W 72/121* (2013.01); *H04W 72/1273* (2013.01)
(58) Field of Classification Search
CPC ... H04L 1/0003; H04L 1/0009; H04L 5/0037; H04L 5/0044; H04L 5/006;
(Continued)

(56) References Cited

U.S. PATENT DOCUMENTS 8,155,064 B2 * 4/2012 Harada .............. H04W 72/085
370/329
9,113,430 B2  8/2015 Osterling et al.
(Continued)

FOREIGN PATENT DOCUMENTS

RU    2428794 C2    9/2011
RU    2443079 C2    2/2012
(Continued)

OTHER PUBLICATIONS

Stacy, Robert, "Specification Framework for TGax", IEEE 802.11-15/0132r8; Wireless LANs, Sep. 22, 2015, pp. 1-22.

*Primary Examiner* — Liton Miah
(74) *Attorney, Agent, or Firm* — Murphy, Bilak & Homilier, PLLC (57) ABSTRACT

Disclosed is a method for an access point of scheduling a plurality of wireless communication devices for transmission. The method comprises selecting (210) a respective modulation and coding scheme—MCS—for each of the plurality of wireless communication devices, wherein each of the respective MCS:s is associated with a respective power back-off, sorting (220) the plurality of wireless communication devices into two or more groups, wherein each group has a maximum size, and scheduling (230) each of the two or more groups of wireless communication devices on different respective transmission resources. The sorting comprises letting first wireless communication devices having the same first respective MCS and the same first respective power back-off belong to the same group. The sorting also comprises (if the maximum size is not reached for the group) letting a second wireless communication device having a second respective MCS and a second respective power back-off belong to the group if a grouping criterion is met. The grouping criterion is based on at least the first
(Continued)

respective power back-off. Corresponding arrangement, access point and computer program product are also disclosed.

15 Claims, 4 Drawing Sheets

(58) Field of Classification Search
CPC ......... H04W 52/0216; H04W 52/0219; H04W 72/121; H04W 72/1273
See application file for complete search history.

(56) References Cited

U.S. PATENT DOCUMENTS

| | | | | |
|---|---|---|---|---|
| 9,986,581 | B2* | 5/2018 | Gao | H04B 7/0452 |
| 10,075,969 | B2* | 9/2018 | Bertrand | H04W 72/1231 |
| 10,313,987 | B2* | 6/2019 | Li | H04W 52/241 |
| 10,542,556 | B2* | 1/2020 | Mallik | H04L 5/0096 |
| 2008/0207143 | A1 | 8/2008 | Skarby et al. | |
| 2008/0207150 | A1 | 8/2008 | Malladi et al. | |
| 2008/0225783 | A1* | 9/2008 | Wang | H04W 72/042 370/329 |
| 2010/0041430 | A1* | 2/2010 | Ishii | H04W 52/04 455/522 |
| 2010/0177717 | A1* | 7/2010 | Sung | H04W 72/042 370/329 |
| 2015/0003370 | A1* | 1/2015 | Yokomakura | H04W 72/0406 370/329 |
| 2015/0092590 | A1* | 4/2015 | Zhu | H04L 1/0017 370/253 |
| 2017/0070961 | A1 | 3/2017 | Bharadwaj et al. | |
| 2017/0086148 | A1* | 3/2017 | Jung | H04W 52/146 |
| 2018/0103434 | A1* | 4/2018 | Zhou | H04W 52/242 |

FOREIGN PATENT DOCUMENTS

| | | |
|---|---|---|
| WO | 2010101497 A1 | 9/2010 |
| WO | 2017032463 A1 | 3/2017 |
| WO | 2017034448 A1 | 3/2017 |

* cited by examiner

SCHEDULING OF WIRELESS COMMUNICATION DEVICES

TECHNICAL FIELD

The present disclosure relates generally to the field of wireless communication. More particularly, it relates to multi-user scheduling of wireless communication devices.

BACKGROUND

Orthogonal Frequency Division Multiplexing (OFDM) is a communication scheme well suited for wideband systems in frequency selective fading environments. For example, a deep fade or narrowband interference typically only impacts a few sub-carriers of an OFDM system, and such impact can typically be mitigated by forward error control coding. Furthermore, since a power spectrum density profile with very steep edges can be created using the narrow sub-carriers, OFDM is bandwidth efficient. Orthogonal Frequency Division Multiple Access (OFDMA) is a multi-user version of OFDM, where multiple access is achieved by assigning disjoint sets of sub-carriers to each user.

Example systems that applies OFDMA include several of the 802.11 standards developed by IEEE (Institute of Electrical and Electronics Engineers) and UMTS LTE (Universal Mobile Telecommunication System, Long Term Evolution) developed by 3GPP (Third Generation Partnership Project).

In OFDMA, where different sets of sub-carriers are assigned to different users and where the different users may be associated with different modulation and coding schemes (MCS), the maximum transmit power selection typically depends on EVM (error vector magnitude) and PAPR (peak-to-average power ratio) as will be elaborated in the following.

An ideal transmitter would only transmit the exact signal constellation points of the applicable MCS. However, various imperfections in the implementation of actual transmitters (e.g. non-linarites, in-phase/quadrature (IQ-) imbalance, phase noise etc.) cause the actually transmitted signal to deviate from the ideal signal constellation points of the MCS. The EVM may be used as a measure of how much the transmitted signal varies in relation to the ideal signal constellation points, and may thereby be used to quantify the performance of a digital radio transmitter. High order signal constellations (e.g. 64-QAM, Quadrature Amplitude Modulation, and 256-QAM) typically require a significantly lower EVM than lower order signal constellations (e.g. BPSK, Binary Phase Shift Keying, and QPSK, Quadrature Phase Shift Keying). Table 1 exemplifies this by listing requirements of relative signal constellation error (which is an expression associated with the EVM) for all MCS:s in the physical layer of IEEE 802.11ac.

TABLE 1

| MCS | Modulation | Coding Rate | Relative Constellation Error (dB) |
| --- | --- | --- | --- |
| 0 | BPSK | 1/2 | −5 |
| 1 | QPSK | 1/2 | −10 |
| 2 | QPSK | 3/4 | −13 |
| 3 | 16-QAM | 1/2 | −16 |
| 4 | 16-QAM | 3/4 | −19 |
| 5 | 64-QAM | 2/3 | −22 |
| 6 | 64-QAM | 3/4 | −25 |
| 7 | 64-QAM | 5/6 | −27 |
| 8 | 256-QAM | 3/4 | −30 |
| 9 | 256-QAM | 5/6 | −32 |

A high PAPR, which is characteristic when high order signal constellations are used, typically degrades the efficiency that can be achieved in the power amplifier (PA) of the transmitter, since the PA has to be operated in a region with large linear range and since such region is typically not achievable if a too high transmission power is used. Thus, a transmission power back-off typically needs to be applied when an OFDM signal (or other signals with a high PAPR) is transmitted. A transmission power back-off may, for example, be defined as a discrepancy between an average transmission power used and a maximum transmission power associated with the transmitter.

Thus, a relatively high order signal constellation leads to that a relatively large power back-off is needed due to the high PAPR, and the (average) transmitted power for higher order modulation formats are often a few dB lower than for the lower order (robust) modulation formats. Therefore, and due to the relatively strict requirements on EVM for high order signal constellations, relatively high order signal constellations can only be used when the channel conditions are beneficial.

In an OFDMA system, different order modulation formats may typically be used for different users. When a power amplifier is operated with OFDMA, the modulation with the strictest requirement regarding EVM determines the power back-off. The performance of a low order modulation may be degraded if the power back-off is relatively large, where a large power back-off may be the result of a high order modulation being used at the same time for another user.

Wo 2010/101497 A1 discloses identifying users which need different orders of modulation and grouping transmission to different users into different sub-units so that transmissions to users who need the same order of modulation are grouped into the same sub-units.

Such an approach is not always efficient. For example, the grouping may lead to un-used transmission resources due to small groups.

Therefore, there is a need for alternative or improved approaches to multi-user scheduling of wireless communication devices (users). Preferably, such approaches are efficient in terms of transmission resources. Furthermore, the approaches should preferably achieve that the throughput of one user is not unnecessarily limited by the requirements of another user.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method for an access point of scheduling a plurality of wireless communication devices for transmission. The method comprises selecting a respective modulation and coding scheme (MCS) for each of the plurality of wireless communication devices (wherein each of the respective MCS:s is associated with a respective power back-off), sorting the plurality of wireless communication devices into two or more groups (wherein each group has a maximum size), and scheduling each of the two or more groups of wireless communication devices on different respective transmission resources.

The sorting comprises letting first wireless communication devices having the same first respective MCS and the same first respective power back-off belong to the same group, and (if the maximum size is not reached for the group) letting a second wireless communication device having a second respective MCS and a second respective power back-off belong to the group if a grouping criterion is met. The grouping criterion is based on at least the first respective power back-off.

The second respective power back-off is lower than the first respective power back-off according to some embodiments. In some embodiments, the second respective power back-off is equal to the first respective power back-off. In yet some embodiments, the second respective power back-off is lower than or equal to the first respective power back-off.

In some embodiments, the method further comprises transmitting data to the plurality of wireless communication devices according to the scheduling of the two or more groups.

According to some embodiments, the different transmission resources comprise one or more of: different time resources, different frequency resources, and different spatial resources.

In some embodiments, the grouping criterion comprises an absolute difference between the first and second respective power back-offs being smaller than any other, non-zero, absolute difference between the first respective power back-off and a respective power back-off associated with a respective MCS of any of the plurality of wireless communication devices.

A transmission channel between the access point and the second wireless communication device is characterized by a performance metric according to some embodiments.

In some embodiments, the grouping criterion comprises the performance metric being larger than a performance metric threshold, wherein the performance metric threshold is based on the first respective power back-off.

The sorting further comprises selecting (for the first wireless communication devices) a new first respective MCS associated with a new first respective power back-off that is lower than the first respective power back-off according to some embodiments.

In some embodiments, selecting the respective MCS comprises (for potential first wireless communication devices) selecting the first respective MCS based on at least one of:
 one or more already selected second respective MCS:s for potential second wireless communication devices, and
 the performance metric being larger than a potential performance metric threshold based on the first respective power back-off to be selected.

A second aspect is a computer program product comprising a computer readable medium, having thereon a computer program comprising program instructions. The computer program is loadable into a data processing unit and configured to cause execution of the method according to the first aspect when the computer program is run by the data processing unit.

A third aspect is an arrangement for an access point for scheduling a plurality of wireless communication devices for transmission. The arrangement comprises a controller configured to cause selection of a respective modulation and coding scheme (MCS) for each of the plurality of wireless communication devices (wherein each of the respective MCS:s is associated with a respective power back-off), sorting of the plurality of wireless communication devices into two or more groups (wherein each group has a maximum size), and scheduling of each of the two or more groups of wireless communication devices on different respective transmission resources.

The controller is configured to cause the sorting by letting first wireless communication devices having the same first respective MCS and the same first respective power back-off belong to the same group, and (if the maximum size is not reached for the group) letting a second wireless communication device having a second respective MCS and a second respective power back-off belong to the group if a grouping criterion is met. The grouping criterion is based on at least the first respective power back-off.

In some embodiments, the controller is further configured to cause transmission of data to the plurality of wireless communication devices according to the scheduling of the two or more groups.

The selection may be performed by a selector (e.g. selection circuitry, link adaptation circuitry) in some embodiments. The sorting may be performed by a sorter (e.g. scheduler, scheduling circuitry) in some embodiments. The scheduling may be performed by a scheduler (e.g. scheduling circuitry) in some embodiments. The transmission may be performed by a transmitter (e.g. transmitting circuitry) in some embodiments.

A fourth aspect is an arrangement for an access point for scheduling a plurality of wireless communication devices for transmission. The arrangement comprises selection circuitry configured to select a respective modulation and coding scheme (MCS) for each of the plurality of wireless communication devices (wherein each of the respective MCS:s is associated with a respective power back-off), sorting circuitry configured to sort the plurality of wireless communication devices into two or more groups (wherein each group has a maximum size), and scheduling circuitry configured to schedule each of the two or more groups of wireless communication devices on different respective transmission resources.

The sorting circuitry is configured to sort by letting first wireless communication devices having the same first respective MCS and the same first respective power back-off belong to the same group, and (if the maximum size is not reached for the group) letting a second wireless communication device having a second respective MCS and a second respective power back-off belong to the group if a grouping criterion is met. The grouping criterion is based on at least the first respective power back-off.

A fifth aspect is an access point comprising the arrangement of any of the third or fourth aspects.

In some embodiments, any of the above aspects may additionally have features identical with or corresponding to any of the various features as explained above for any of the other aspects.

An advantage of some embodiments is that efficient scheduling of a plurality of wireless communication devices is provided. The efficiency may, for example, manifest itself in one or more of the following ways:
 that available transmissions resources are not left unnecessarily empty,
 that a user is not unnecessarily forced to use a lower modulation order than possible,
 that a user is not unnecessarily forced to use a larger power back-off than necessary.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 1 is a schematic drawing illustrating an example scenario where some embodiments may be applicable.

DETAILED DESCRIPTION

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where a plurality of wireless communication devices (used interchangeably with "users" and "STA" (for station) herein) may be effectively scheduled for downlink transmission. The embodiments are typically performed by an access point serving the plurality of wireless communication devices.

Embodiments are particularly applicable in OFDMA systems, but embodiments may be equally applicable in any multiple access system where different users may have different modulation and coding schemes (MCS) and may share at least one transmission resource.

Generally, performance may be quantified in accordance with any suitable performance metric. Examples of such metrics include, but are not limited to, bit error rate (BER), block error rate (BLER), packet error rate, signal-to-noise ratio (SNR), signal-to-interference ratio (SIR), signal-to-interference-and-noise ratio (SINR), received signal strength indicator (RSSI), reference signal received power (RSRP), received signal code power (RSCP), etc.

Also generally and according to some embodiments, the transmission may be downlink transmission, the data may be downlink data, and the transmission channel may refer to downlink transmission channel. In the following the downlink example will be used to illustrate various embodiments. However, embodiments are generally applicable also to other multi-user scheduling situations.

Figure 1:
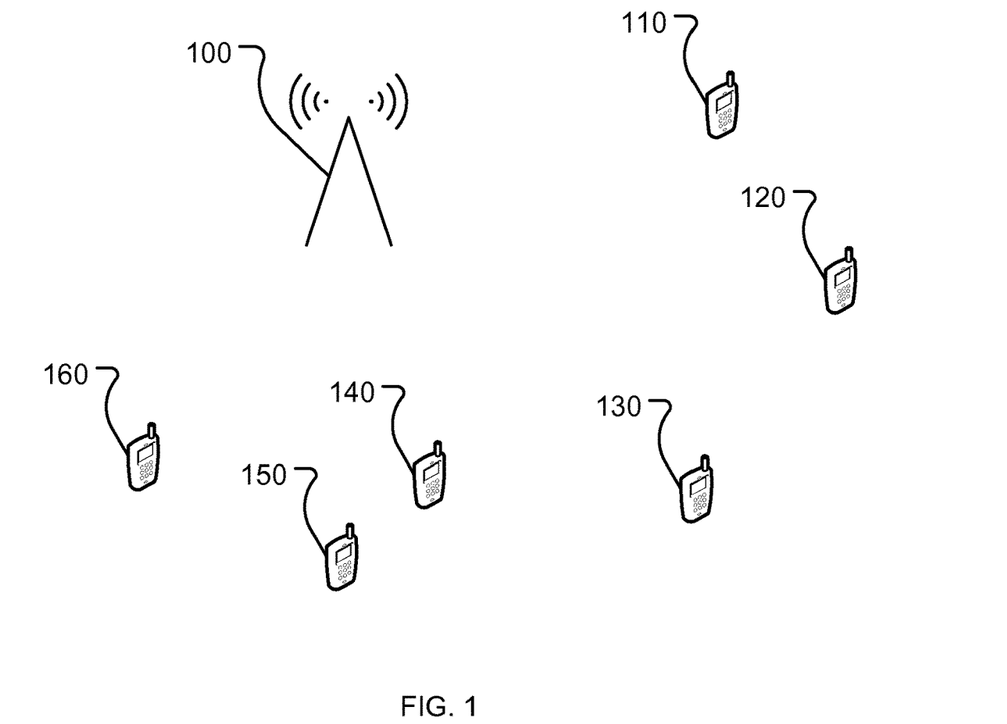

FIG. 1 is a schematic illustration of an example scenario where some embodiments may be applicable. In this scenario an access point 100 serves a plurality of wireless communication devices 110, 120, 130, 140, 150 and 160 in a multiple access fashion (e.g. using OFDMA). Due to link adaptation, one or all of the wireless communication devices 110, 120, 130, 140, 150 and 160 may be associated with different MSC:s and the different MCS:s may in turn be associated with different power back-offs as explained above. One approach to scheduling of the wireless communication devices 110, 120, 130, 140, 150 and 160 is to sort the plurality of wireless communication devices into two or more groups, wherein all devices in each group are associated with the same MCS, and schedule each group on a separate transmission resource. However, such an approach may be ineffective in that, if a group contains only one or a few wireless communication devices, the transmission resource of that group may not be fully utilized.

Figure 2:
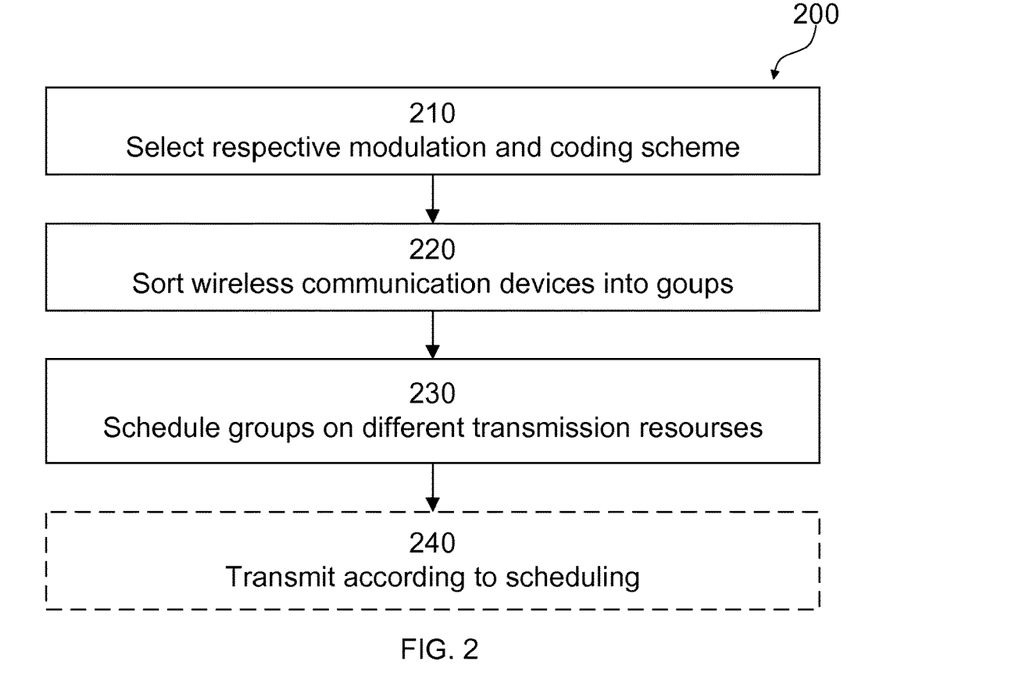
FIG. 2 is a flowchart illustrating example method steps according to some embodiments.

FIG. 2 illustrates an example method 200 of scheduling a plurality of wireless communication devices (e.g. the wireless communication devices 110, 120, 130, 140, 150 and 160 of FIG. 1) for downlink transmission according to some embodiments. The method is for, and may be performed by, an access point (e.g. the access point 100 of FIG. 1).

In step 210, a respective modulation and coding scheme (MCS) is selected for each of the plurality of wireless communication devices. Each of the respective MCS:s is associated with a respective power back-off. Two different MCS:s may be associated with the same or different respective power back-offs.

In step 220, the plurality of wireless communication devices are sorted into two or more (e.g. two, three, four, etc.) groups, and in step 230, each of the two or more groups of wireless communication devices is scheduled on a different respective transmission resource. The different transmission resources may, for example, comprise one or more of: different time resources, different frequency resources, and different spatial resources (e.g. provided by antenna diversity, multiple-input multiple output (MIMO) techniques, or similar).

In optional step 240, downlink data may be transmitted to the plurality of wireless communication devices according to the scheduling of the two or more groups.

Figure 3:
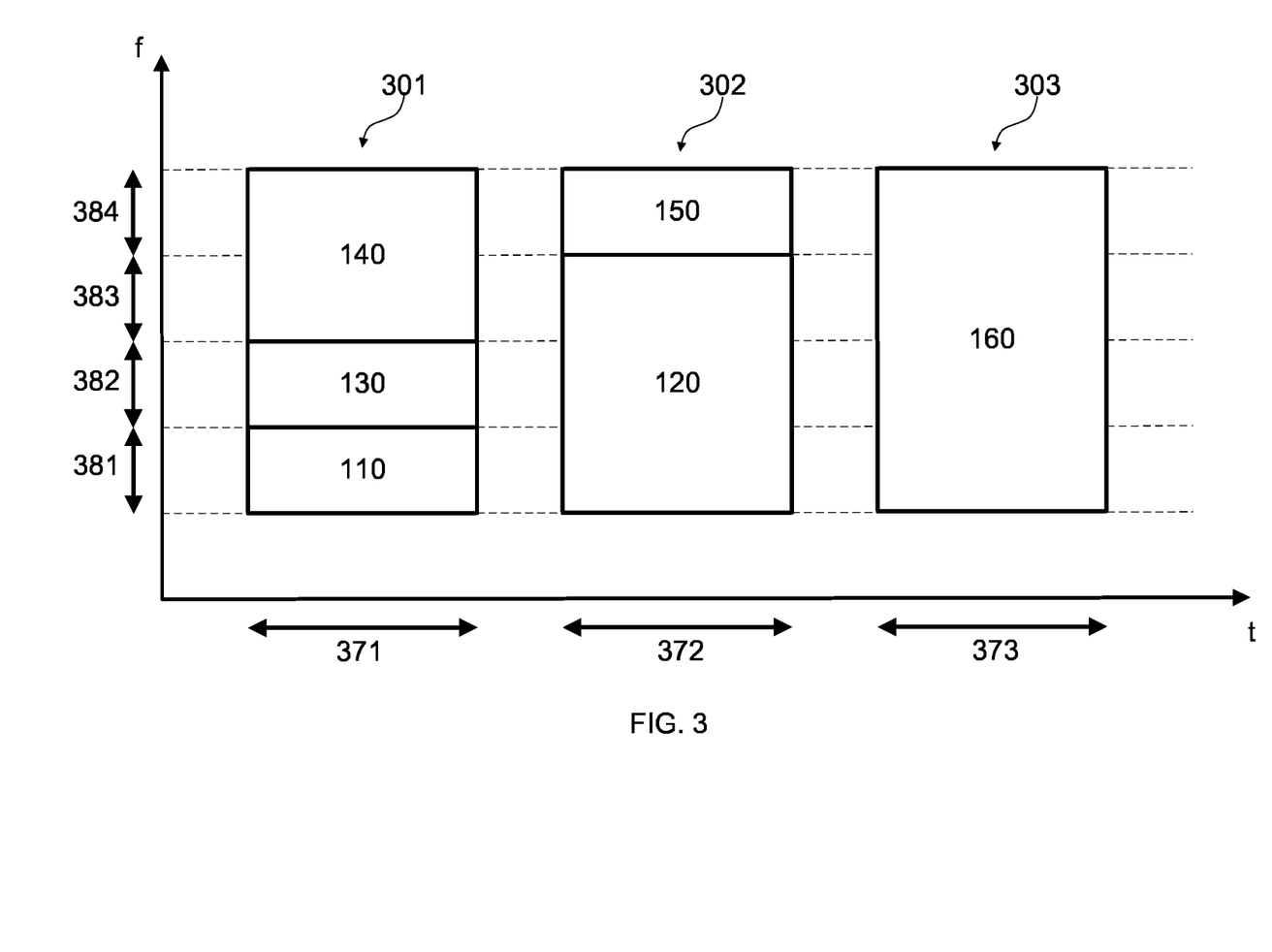
FIG. 3 is a schematic drawing illustrating example scheduling of groups according to some embodiments.

FIG. 3 is a schematic illustration of example scheduling of groups in an access point (e.g. the access point 100 of FIG. 1) according to some embodiments. The illustration shows a division of a time (t)-frequency (f) plane into transmission resources. In this example, each transmission resource is defined by a frequency interval 381, 382, 383, 384 (e.g. sub-carriers or sets of sub-carriers in OFDM) and/or a time interval 371, 372, 373 (e.g. frames, sub-frames, etc.). For example, each transmission resource defined by a frequency interval and a time interval may be a resource unit (RU) in OFDM. A transmission packet 301, 302, 303 is scheduled for transmission during each of the time interval 371, 372, 373 in this example (compare with step 230 of FIG. 2).

Each transmission packet 301, 302, 303 contains data intended for different wireless communication devices (e.g. the wireless communication devices 110, 120, 130, 140, 150 and 160 of FIG. 1). To this end, the wireless communication devices are grouped together, or sorted (compare with step 220 of FIG. 2), in a manner that will be exemplified in connection with FIG. 4.

Figure 4:
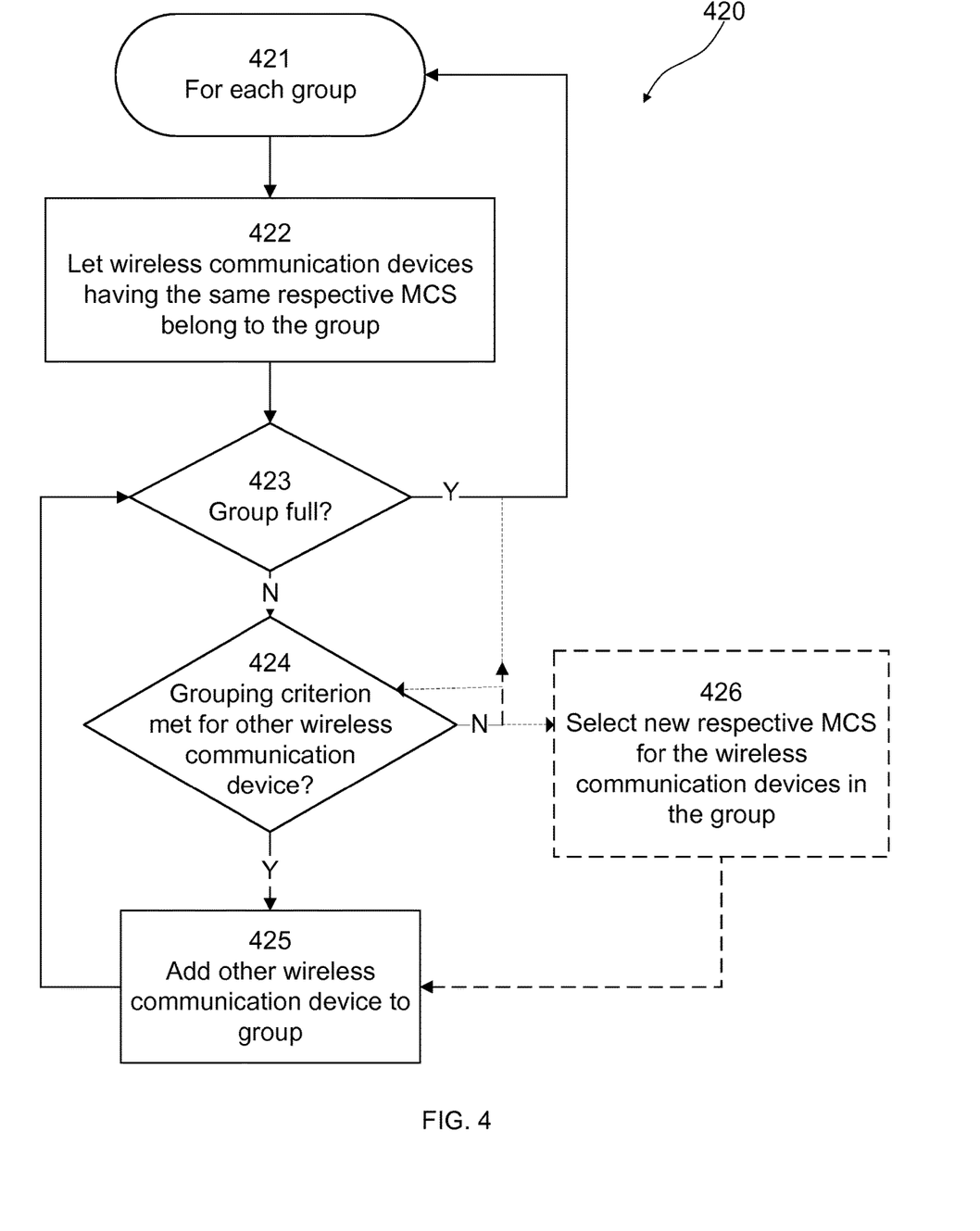
FIG. 4 is a flowchart illustrating example method steps according to some embodiments.

FIG. 4 illustrates an example method 420 of sorting a plurality of wireless communication devices into two or more groups. The method 420 may, for example, be performed as part of step 220 of FIG. 2. It should be noted that even though FIG. 4 illustrates that groups as being processed in sequence as indicated by step 421, this is by no means limiting. Rather, the sorting into groups may be performed in any suitable order (e.g. in parallel for all groups) according to some embodiments.

The sorting comprises letting (first) wireless communication devices having the same (first) respective MCS, and thereby the same (first) respective power back-off, belong to the same group as illustrated by step 422.

Each group has a maximum size. The maximum size may typically be defined in terms of the amount of downlink data to be transmitted that may be accommodated in the transmission resource (compare with 301, 302, 303 of FIG. 3) where the group is to be scheduled (compare with step 230 of FIG. 2). Thus, if each of the plurality of wireless communication devices is associated with an amount of downlink data to be transmitted, the maximum size of a group may be reached when the collective amount of downlink data associated with all the wireless communication devices belonging to the group equals the amount of downlink data that may be accommodated in the transmission resource. In some embodiments, a group may be considered full when the maximum size of the group is reached. In some embodiments, a group may be considered full when the the collective amount of downlink data of the group reaches a threshold which is lower than the maximum size of the group.

If the group is not full as illustrated by the N-path out of step 423, the method continues to step 424. If the group is full as illustrated by the Y-path out of step 423, the method returns to step 421 to process other groups as applicable.

In step 424, it is determined whether a grouping criterion is met for another (second) wireless communication device. The other (second) wireless communication device has another (second) respective MCS and a (second) respective power back-off, which may be lower than (or equal to) the first respective power back-off.

If the grouping criterion is met (Y-path out of step 424), the sorting comprises letting the other (second) wireless communication device belong to the group as illustrated by step 425. Then the method returns to step 423 where it is determined whether or not the group is full now.

If the grouping criterion is not met (N-path out of step 424), the method may according to various embodiments perform one of the following transfers:
- return to step 421 to process other groups as applicable,
- return to step 424 to determine whether a grouping criterion is met for yet another wireless communication device, or
- proceed to step 426.

Procession to step 426 may, for example, be applicable if the grouping criterion is not met for any of the plurality of wireless communication devices.

In step 426, a new (first) respective MCS is selected for the (first) wireless communication devices in the group. The new respective MCS is associated with a new (first) respective power back-off that is lower than the previous (first) respective power back-off. Preferably, the new respective MCS is selected such that the grouping criterion is now met for the other wireless communication device, and the other wireless communication device may be added to the group as illustrated by the method proceeding to step 425 after step 426.

In some embodiments, the principles of step 426 are applied already at the selection step 210 of FIG. 2. Then, the selection of step 210 for (potential first) wireless communication devices (typically those which would be associated with a high order modulation) is based on at least one of:
- one or more already selected (second) respective MCS:s for (potential second) wireless communication devices, and
- a performance metric characterizing a downlink transmission channel between the access point and the (potential second) wireless communication device being larger than a potential performance metric threshold based on the (first) respective power back-off to be selected.

Thus, respective MCS may be selected already at step 210 (e.g. link adaptation) such that the grouping criterion will be met.

As will be exemplified further herein, the grouping criterion of step 424 may comprise one of, or any combination of, a number of criteria. Generally, the grouping criterion is based on at least the (first) respective power back-off of the wireless communication devices already in the group. In some embodiments, the grouping criterion may also be based on a performance metric characterizing a downlink transmission channel between the access point and the second wireless communication device.

In some embodiments, the grouping criterion may comprise an absolute difference between the first and second respective power back-offs being smaller than any other, non-zero, absolute difference between the first respective power back-off and a respective power back-off associated with a respective MCS of any of the plurality of wireless communication devices. Thus, in these embodiments the wireless communication device(s) that are added to the group are those with most similar respective power back-off to the wireless communication devices already in the group.

In some embodiments, the grouping criterion may comprise the performance metric being larger than a performance metric threshold, wherein the performance metric threshold is based on the first respective power back-off. Typically, in these embodiments the wireless communication device(s) that are added to the group are those with a downlink channel which is good enough to handle the respective power back-off of the wireless communication devices already in the group.

The performance metric may be any suitable metric including, but not limited to, channel quality, channel gain, signal-to-noise ratio, signal-to-interference ratio, signal-to-interference-and-noise ratio, channel quality indicator, packet error rate, etc.

Figure 5:
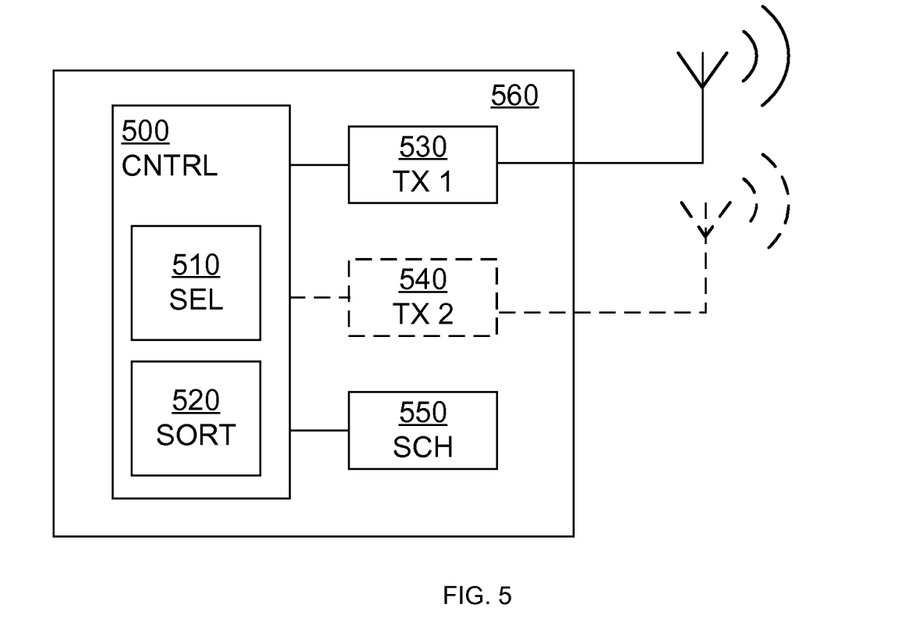
FIG. 5 is a schematic block diagram illustrating an example arrangement according to some embodiments.

FIG. 5 schematically illustrates an example arrangement 560 for an access point according to some embodiments, for scheduling a plurality of wireless communication devices for downlink transmission. For example, the arrangement 560 may be comprised in an access point and/or may be adapted to perform one or more of the method steps described above in connection to FIGS. 2 and 4.

The example arrangement 560 comprises a controller (CNTRL) 500. Furthermore, the arrangement 560 and/or the controller 500 may comprise or be otherwise associated with one or more of a selector (SEL) 510, a sorter (SORT) 520, a scheduler (SCH) 550, and one or more transmitters (TX 1, TX 2) 530, 540.

The controller 500 is configured to cause selection of a respective modulation and coding scheme (MCS) for each of the plurality of wireless communication devices (wherein each of the respective MCS:s is associated with a respective power back-off), sorting of the plurality of wireless communication devices into two or more groups (wherein each group has a maximum size), and scheduling of each of the two or more groups of wireless communication devices on different respective transmission resources (compare with steps 210, 220, 230 of FIG. 2).

The controller 500 may also be configured to cause transmission of downlink data to the plurality of wireless communication devices according to the scheduling of the two or more groups (compare with step 240 of FIG. 2).

The controller 500 is configured to cause the sorting by letting first wireless communication devices having the same first respective MCS and the same first respective power back-off belong to the same group, and (if the maximum size is not reached for the group) letting a second wireless communication device having a second respective MCS and a second respective power back-off belong to the group if a grouping criterion is met (compare with FIG. 4).

The selection may be performed by the selector 510 (which may, for example comprise selection circuitry, link adaptation circuitry, or similar). The sorting may be performed by the sorter 520 (which may, for example comprise sorting circuitry) or by the scheduler 500 (which may, for example comprise scheduling circuitry). The scheduling may be performed by the scheduler 550 (which may, for example comprise scheduling circuitry). The transmission may be performed by the transmitter(s) 530, 540 (which may, for example comprise transmitting circuitry).

Returning to the example of FIG. 3 and assuming that the wireless communication devices are associated with MCS:s (or rather their modulation formats) as follows: 110 uses 256-QAM, 120 uses QPSK, 130 uses 64-QAM, 140 uses 256-QAM, 150 uses BPSK and 160 uses BPSK.

As mentioned earlier, one way of scheduling the wireless communication devices to handle the power back-off in relation to the EVM requirements is to group together wireless communication devices with the same MCS. Such an approach would lead to 5 groups in this example: one for 256-QAM (110 and 140) one for 64-QAM (130), one for QPSK (120) and two for BPSK (150, 160) since 160 has a large amount of downlink data. This would lead to inefficient use of resources since only the packets of the group containing 160 would fully utilize the transmission capacity.

According to some embodiments, a more efficient approach is to also group together wireless communication devices with different MCS:s provided that the grouping criterion is met.

For example, wireless communication devices using 64-QAM (130) may be grouped together with wireless communication devices using 256-QAM (110 and 140) as illustrated in packet 301 of FIG. 3, and wireless communication devices using BPSK (150) may be grouped together with wireless communication devices using QPSK (120) as illustrated in packet 302 of FIG. 3.

As will be exemplified even further later on, the grouping may take downlink channel conditions into account to ensure that the EVM requirements of all members of a group are met under condition of the power back-off imposed by the highest order signal constellation in the group. Such an approach may additionally comprise adjusting the highest order signal constellation in the group if needed to be able to fill the group. Alternatively, the grouping may not take account of downlink channel conditions, but only consider which signal constellations are most similar. In such an approach, it may not necessarily be ensured that the EVM requirements of all members of a group are met under condition of the power back-off imposed by the highest order signal constellation in the group.

According to the various embodiments described herein, the access point may apply different behavior depending on whether or not channel characteristics (e.g. channel gain) are known, whether or not the link adaptation may be modified, and/or whether or not multiple antennas are available. Some further illustrative examples of various embodiments will now be given.

In a first example, scheduling at an access point (AP) is done based on MCS and on channel gain and only two RU:s are used in a 64-QAM (MCS5) modulated packet. This may be because only two STA:s have a channel gain that is good enough to support this MCS. If there is another STA, whose channel is much better than needed to support 16-QAM (MCS4, the next lower MCS) but not good enough to support 64-QAM (MCS5), the AP can schedule this 16-QAM modulated user on the 64-QAM modulated packet as long as the excess power back-off due to 64-QAM ($P_{64\text{-}QAM}$(MCS5)-$P_{16\text{-}QAM}$(MCS4)) does harm the 16-QAM modulated signal (i.e. as long as the channel gain compensates for the power back-off). According to this example, users with different MCS:s can be scheduled in the same packet without having the power back-off mechanism deteriorate performance, which results in increased RU usage ratio.

In a second example, BPSK (MCS0) is intended to be used for one STA (STA1) while 64-QAM (MCS5) is scheduled for another STA (STA2), which has more favorable channel conditions. If it is determined that using the back-off required for successful reception for STA2 will cause a too low transmit power for STA1 (and that using a small back-off to ensure successful reception for STA1 would result in too high EVM values for STA2), the selection of back-off for the PA may be based on a compromise as follows. First, the STA with the most stringent requirements on receiver power is considered, i.e., the STA with the smallest MCS (STA1). Based on the estimated channel conditions, it is determined how much additional back-off can be used while ensuring that the transmitted power is sufficient for this STA. Then, based on the determined back-off, the MCS for the other STA(s) (STA2) is selected. For this example, assuming that it would be possible to back-off the PA an additional 2 dB when considering STA1, these additional 2 dB results in that 64-QAM (MCS5) is not possible to use for STA2 but 16-QAM (MCS4) is. Thus, according to this example the common back-off and MCS for the different STA:s are optimized jointly.

In a third example, scheduling at the AP is done considering only MCS and not the channel characteristics. If not all RU:s are used for transmission in a 256-QAM (MCS8) modulated packet and there are two more STA:s to be served at a given time (one that is BPSK (MCS0) modulated and one that is 64-QAM (MCS6) modulated), the AP may consider the differences in power back-off when determining which STA to schedule together in the 256-QAM packet. Since ($P_{256\text{-}QAM}$(MCS8)-$P_{BPSK}$(MCS0))>($P_{256\text{-}QAM}$(MCS8)-$P_{64\text{-}QAM}$(MCS6), the STA that is 64-QAM(MCS6) modulated should be selected for transmission in the 256-QAM (MCS8) modulated packet.

In a fourth example, the link adaptation algorithm of the AP for selecting MCS(s) for STA(s) does not only consider conventional link parameters such as ACK/NACK statistics (e.g., in Minstrel) but also the set of MCS:s currently used for transmitting toward other STA(s). For example, if the link adaptation algorithm outputs a MCS that is currently not used by the AP for any other STA, the AP may use a different MCS based on the set of MCS:s currently used, and/or channel gains (as it is described in the first example). If the AP serves two users with modulation 64-QAM(MCS7) and there is another user for which the link adaptation algorithm suggests to use 256-QAM(MCS8). If this other user is scheduled with the two 64-QAM users, the latter could be harmed by the higher back-off power needed for 256-QAM. If it is determined that the two 64-QAM(MCS7) modulated users can both accept the excess power back-off due to 256-QAM, then all users may be scheduled in the same packet and 256-QAM may be used for the new user (compare with the first example). If it is determined that one or both of the two 64-QAM(MCS7) modulated users cannot afford the excess power back-off due to 256-QAM, then the AP can select a lower modulation (e.g. 64-QAM(MCS7)) for the new user, so that all users can be scheduled in the same packet.

In most of the examples and embodiments described above, the separation between groups has been in terms of packet being transmitted at different times. However, separations may (alternatively or additionally) be achieved in other ways.

One example is applicable when the AP has more than one antenna and more than one transmitter chain (e.g. to support MIMO and/or other forms of transmit diversity schemes), wherein each transmitter chain is independent and has its own PA, and wherein the transmitter chains are synchronized in time and frequency to a common frequency source (PLL or XO). Then, the AP may consider transmitting different RU allocations with very different back-off requirements on separate transmitter chains, where each transmitter chain only transmits in part of the bandwidth. By using this approach, it is possible to apply different power back-offs for each transmitter chain.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as an access point (e.g. a network node).

Embodiments may appear within an electronic apparatus (such as an access point) comprising arrangements, circuitry, and/or logic according to any of the embodiments described herein. Alternatively or additionally, an electronic apparatus (such as an access point) may be configured to perform methods according to any of the embodiments described herein.

Figure 6:
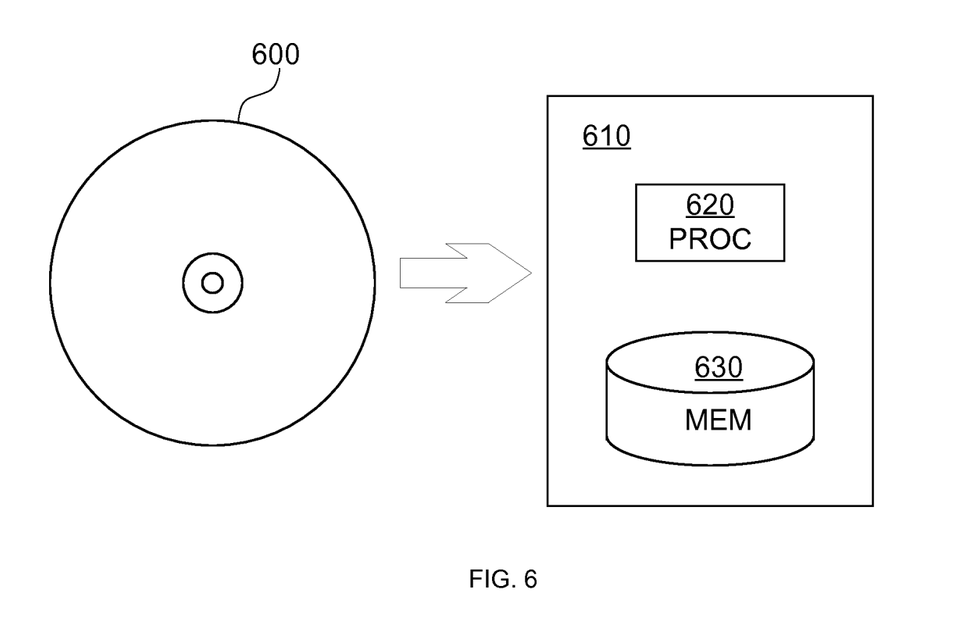
FIG. 6 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC) 629, which may, for example, be comprised in as an access point 610. When loaded into the data processing unit, the computer program may be stored in a memory (MEM) 630 associated with or comprised in the data-processing unit. According to some embodiments, the computer program may, when loaded into and run by the data processing unit, cause execution of method steps according to, for example, any of the methods illustrated in FIGS. 2 and 4.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method, performed by an access point, for scheduling transmission to a plurality of wireless communication devices, the method comprising:
   selecting respective modulation and coding schemes (MCS) for the wireless communication devices, wherein each selected MCS is associated with a corresponding power back-off;
   sorting the wireless communication devices into two or more groups, wherein each group has a maximum size and wherein sorting comprises:
      letting first wireless communication devices having the same first MCS and the same first power back-off belong to the same group, and
      if the maximum size is not reached for the group, letting a second wireless communication device having a second MCS and a second power back-off belong to the same group, as the first wireless communication devices, if a grouping criterion is met,
      wherein the grouping criterion is based on at least the first power back-off; and
   scheduling each of the two or more groups of wireless communication devices on different transmission resources than used to schedule others of the two or more groups.

2. The method of claim 1 wherein the different transmission resources comprise one or more of: different time resources, different frequency resources, and different spatial resources.

3. The method of claim 1, wherein the grouping criterion comprises an absolute difference between the first and second power back-offs being smaller than any other, non-zero, absolute difference between the first power back-off and a power back-off associated with any other of the plurality of wireless communication devices that have not been sorted into the same group.

4. The method of claim 1, wherein a transmission channel between the access point and the second wireless communication device is characterized by a performance metric.

5. The method of claim 4, wherein the grouping criterion comprises the performance metric being larger than a performance metric threshold, wherein the performance metric threshold is based on the first power back-off.

6. The method of claim 4, wherein the sorting further comprises selecting, for the first wireless communication devices sorted in the same group, a new first MCS associated with a new first power back-off that is lower than the first power back-off.

7. The method of claim 4, wherein selecting respective MCS for the wireless communication devices comprises, for potential first wireless communication devices, selecting the first MCS based on at least one of the following:
   one or more already selected second MCS for potential second wireless communication devices; and
   a performance metric associated with the transmission channel being larger than a performance metric threshold that is based on the first power back-off associated with the first MCS to be selected.

8. A non-transitory, computer-readable medium storing program instructions that, when executed by a processor comprising an access point, configure the access point to perform operations corresponding to the method of claim 1.

9. An access point configured to schedule transmission to a plurality of wireless communication devices, the access point comprising:
at least one transmitter; and
a controller operably coupled to the at least one transmitter, the controller being configured to:
select respective modulation and coding schemes (MCS) for the wireless communication devices, wherein each selected MCS is associated with a corresponding power back-off;
sort the wireless communication devices into two or more groups, wherein each group has a maximum size, and wherein the controller is configured to sort by:
letting first wireless communication devices having the same first MCS and the same first power back-off belong to the same group, and
if the maximum size is not reached for the group, letting a second wireless communication device having a second MCS and a second power back-off belong to the same group, as the first wireless communication devices, if a grouping criterion is met,
wherein the grouping criterion is based on at least the first power back-off; and
schedule each of the two or more groups of wireless communication devices on different transmission resources than used to schedule others of the two or more groups.

10. The access point of claim 9, wherein the different transmission resources comprise one or more of: different time resources; different frequency resources; and different spatial resources.

11. The access point of claim 9, wherein the grouping criterion comprises an absolute difference between the first and second power back-offs being smaller than any other, non-zero, absolute difference between the first power back-off and a power back-off associated with any other of the plurality of wireless communication devices that have not been sorted into the same group.

12. The access point of any of claim 9, wherein a transmission channel between the access point and the second wireless communication device is characterized by a performance metric.

13. The access point of claim 12, wherein the grouping criterion comprises the performance metric being larger than a performance metric threshold, wherein the performance metric threshold is based on the first power back-off.

14. The access point of claim 12, wherein the controller is further configured to sort the wireless communication devices by selecting, for the first wireless communication devices sorted in the same group, a new first MCS associated with a new first power back-off that is lower than the first power back-off.

15. The access point of claim 12, wherein the controller is further configured to select the respective MCS by selecting the first MCS based on at least one of the following:
one or more already selected second MCS for potential second wireless communication devices; and
a performance metric associated with the transmission channel being larger than a performance metric threshold that is based on the first power back-off associated with the first MCS to be selected.

* * * * *

UNITED STATES PATENT AND TRADEMARK OFFICE
CERTIFICATE OF CORRECTION

PATENT NO. : 10,973,035 B2
APPLICATION NO. : 16/606909
DATED : April 6, 2021
INVENTOR(S) : Nilsson et al.

It is certified that error appears in the above-identified patent and that said Letters Patent is hereby corrected as shown below:

On the Title Page

In Item (74), under "Attorney, Agent, or Firm", in Column 2, Lines 1-2, delete "Murphy, Bilak & Homilier, PLLC" and insert -- Murphy, Bilak & Homiller, PLLC --, therefor.

In the Drawings

In Fig. 2, Sheet 1 of 4, for Step "220", in Line 1, delete "goups" and insert -- groups --, therefor.

In Fig. 2, Sheet 1 of 4, for Step "230", in Line 1, delete "resourses" and insert -- resources --, therefor.

In the Specification

In Column 1, Line 33, delete "(MCS)" and insert -- (MCS(s)) --, therefor.

In Column 1, Line 40, delete "non-linarites," and insert -- non-linearities, --, therefor.

In Column 2, Line 30, delete "Wo 2010/101497 A1" and insert -- WO 2010/101497 A1 --, therefor.

In Column 5, Line 35, delete "(MCS)" and insert -- (MCS(s)) --, therefor.

In Column 5, Line 59, delete "MSC:s" and insert -- MCS:s --, therefor.

In Column 7, Line 9, delete "when the the" and insert -- when the --, therefor.

In Column 9, Line 3, delete "scheduler 500" and insert -- scheduler 550 --, therefor.

In Column 10, Lines 38-39, delete
"($P_{256\text{-}QAM}(MCS8)-P_{BPSK}(MCS0)>(P_{256\text{-}QAM}(MCS8)-P_{64\text{-}QAM}(MCS6)$," and
insert -- $P_{256\text{-}QAM}(MCS8)-P_{BPSK}(MCS0)>P_{256\text{-}QAM}(MCS8)-P_{64\text{-}QAM}(MCS6)$, --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,973,035 B2

In Column 11, Line 20, delete "(DSP)," and insert -- (DSP(s)), --, therefor.

In Column 11, Line 21, delete "(CPU)," and insert -- (CPU(s)), --, therefor.

In Column 11, Line 22, delete "(FPGA)" and insert -- (FPGA(s)) --, therefor.

In Column 11, Line 25, delete "(ASIC)." and insert -- (ASIC(s)). --, therefor.

In Column 11, Line 57, delete "discloses" and insert -- disclose --, therefor.

In the Claims

In Column 12, Line 16, in Claim 1, delete "(MCS)" and insert -- (MCS(s)) --, therefor.

In Column 13, Line 14, in Claim 9, delete "(MCS)" and insert -- (MCS(s)) --, therefor.